(No Model.)
J. DAVIS.
FILTER.
No. 564,305.   Patented July 21, 1896.
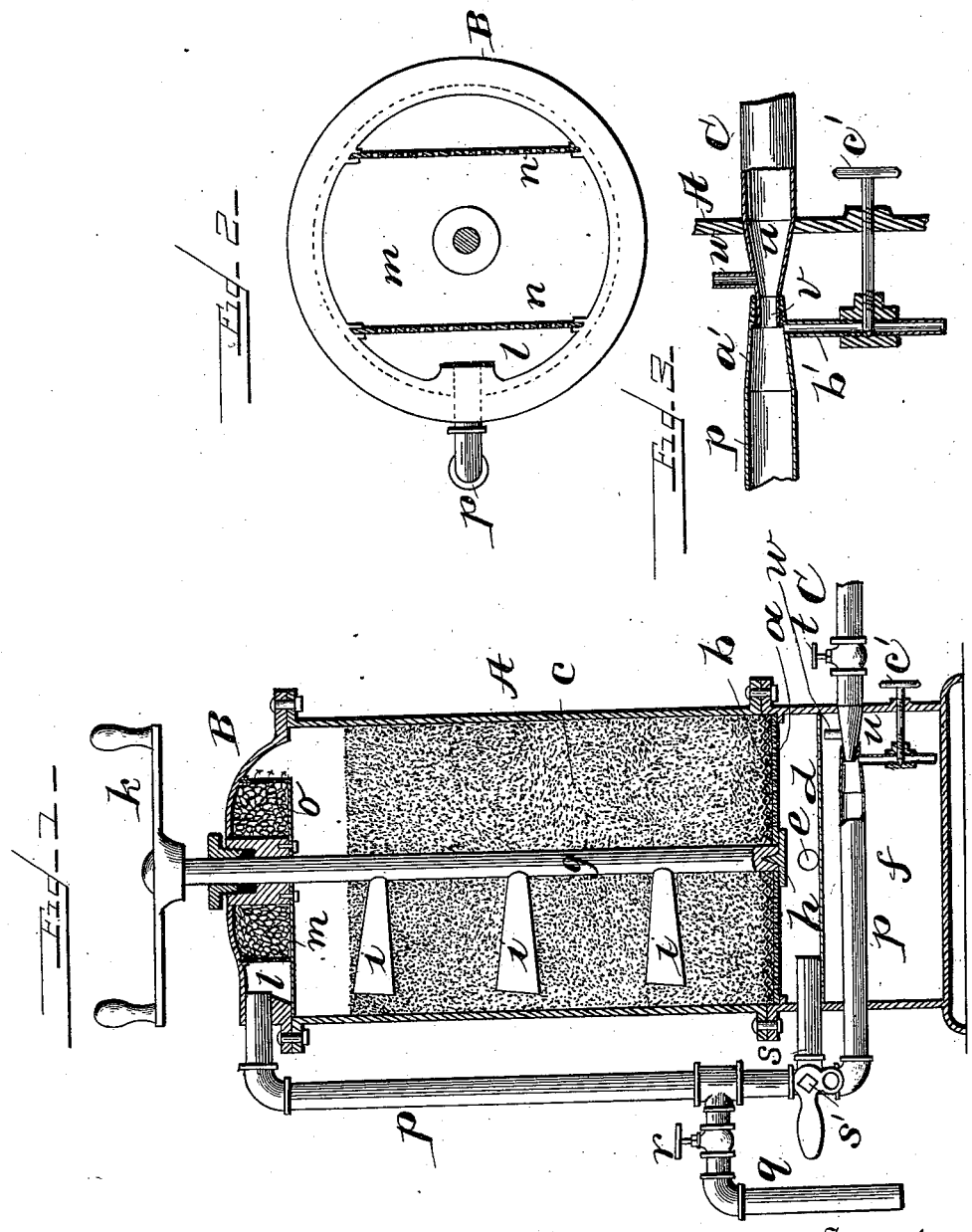

UNITED STATES PATENT OFFICE.

JOHN DAVIS, OF ALLEGHENY, PENNSYLVANIA.

FILTER.

SPECIFICATION forming part of Letters Patent No. 564,305, dated July 21, 1896.

Application filed April 14, 1892. Serial No. 429,126. (No model.)

*To all whom it may concern:*

Be it known that I, JOHN DAVIS, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My present invention relates to filters, and has for its object certain improvements in construction, which will be fully disclosed in the following specification and claims.

In the accompanying drawings, which form part of this specification, Figure 1 represents a side elevation partly in section; Fig. 2, an inverted plan view of the cover of the filter, and Fig. 3 an enlarged sectional view of an ejector for supplying chemicals in solution to the inflowing water.

Reference being had to the drawings and the letters thereon, A indicates the body of a filter which is provided with a foraminous diaphragm $a$ of metal and upon the upper side of which are three meshes of wire $b$ to support and prevent the downward passage of the sand composing the filter-bed $c$. Below the diaphragm $a$ is a clear-water chamber $d$, from which water is drawn through passage $e$ and controlled by a valve, (not shown,) and under the chamber $d$ is a chamber $f$ for the reception of a suitable chemical, such as alum, which is dissolved in said chamber and commingled with the inflowing water to the filter in quantity sufficient to cause the impurities in the water to coagulate. Above the diaphragm $a$ is an agitator consisting of a shaft $g$, supported upon a step $h$ and provided with blades $i$ for raising and agitating the filter-bed when it is desired to cleanse said bed. The agitator is rotated by means of a lever $k$ attached to the upper end thereof.

B indicates the cover of the filter, on the under side of which is a water-distributing chamber $l$ and a pebble-chamber $m$ of uniform width, the latter being formed of two perforated plates $n\ n$, an imperforated bottom plate $o$, and pebbles or globular bodies filling the chamber $m$. The water-chamber $l$ communicates with a pipe $p$, and to said pipe is attached a pipe $q$, having a valve $r$ for discharging waste water, and a pipe $s$ communicating with the clear-water chamber $d$ for supplying water to cleanse the filter-bed. At the junction of the pipe $p$ and pipe $s$ is a three-way cock $s'$ for directing water up through the pipe $p$ above the filter-bed for filtering the water, or into the clear-water chamber $d$ to pass up through and cleanse the filter-bed $c$. The pipe $p$ extends across the chemical-chamber $f$ and communicates with the supply-pipe C, which is provided with a valve $t$ for controlling the supply of water to the filter.

The supply-pipe C is contracted at $u$ by making it conical and terminates in a nozzle $v$ of the diameter of the smallest portion of the conical contraction to arrest the water at this point and divert a portion thereof through discharge-pipe $w$ into the chemical-chamber $f$ to agitate its contents and accelerate dissolution of the solid chemical therein contained, and also to aid in raising the solution through the needle-valve to mingle with the inflowing water. The nozzle $v$ discharges into a reverse conical contraction $a'$ of the pipe $p$, where the column of water discharged from the nozzle $v$ forms a partial vacuum above the pipe $b'$, which causes the water from the chemical-chamber charged or impregnated with the coagulant to rise and mingle with the water passing from said nozzle. The velocity of the water is arrested momentarily in the cone $a'$ and causes the chemical to mix thoroughly with the water as it flows through said contraction and on through pipe $p$ to the filter-chamber, and the quantity of the chemical solution required is regulated by the needle-valve $c'$.

In the operation of filtering the water is discharged from pipe $p$ into chamber $l$ in the cover of the filter, from which it flows into and through the pebble-chamber $m$, where the larger and heavier impurities in their coagulated state are arrested by the pebbles and the water discharged through the outer perforated plate $u$ above the filter-bed $c$, through which it percolates and passes into the clear-water chamber $d$ and is drawn off through passage $e$.

When it is desired to cleanse the filter-bed, the valve $c'$ is closed, the cock $s'$ turned to direct water through pipe $s$ into the chamber $d$, and the waste-valve $r$ opened. The valve $t$ being open, the filter-bed is raised and agitated by revolving the agitator, when the water passing through the filter-bed will scour the particles of sand and loosen all the impurities. The water freighted with the impurities of the filter-bed will then rise and in flowing through the pebble-chamber in numerous fine streams cut off the heavy foreign matter deposited upon the pebbles in a coagulated state. During this cleansing operation the lighter particles of sand from the filter-bed which are cast up or raised by the agitator and the water strike the bottom of the pebble-chamber and the major portion thereof gravitate to the bed again, while the small portion carried by the water through the perforated plate $n$ is arrested by the pebbles and again returned when the course of the water is reversed for filtering.

It will be observed that in either direction the water flows through the pebble-chamber $m$ its passage is in direct lines and of uniform velocity across the filter, thus securing the maximum effect of the pebbles in arresting the larger or coarser impurities in one operation and that of the water in cleansing all the pebbles in the other, and affording ample space in the water-distributing chamber $l$ for the impurities, and thus avoiding the choking of the mouth of the pipe $p$.

Having thus fully described my invention, what I claim is—

1. In a filter, the combination of a chemical-chamber a supply-pipe extending through said chamber and provided with oppositely-arranged conical contractions, a nozzle at the terminal of one of said contractions, a discharge-pipe connected with the supply-pipe and a lifting-pipe below the discharge of said nozzle, the discharge-pipe and the lifting-pipe communicating with the chemical-chamber substantially as described.

2. In a filter a supply-pipe provided with oppositely-arranged conical contractions, a nozzle from one of the contractions extending into the other, a discharge-pipe connected with the contraction having the nozzle and a lifting-pipe in the opposite contraction and below the discharge of said nozzle, in combination with a chemical-chamber substantially as shown and described.

3. A filter having a water-distributing chamber and a pebble-chamber in its cover, the latter chamber having perforate vertical and transverse walls and an imperforate bottom, in combination with a filter-bed substantially as and for the purpose described.

In testimony whereof I affix my signature in presence of two witnesses.

JOHN DAVIS.

Witnesses:
ADDISON Z. BYERS,
EDW. A. HESS.